(12) United States Patent
Cheatle et al.

(10) Patent No.: US 7,251,048 B2
(45) Date of Patent: Jul. 31, 2007

(54) RECORDING IMAGES TOGETHER WITH LINK INFORMATION

(75) Inventors: Stephen Philip Cheatle, Bristol (GB); David Arthur Grosvenor, Bristol (GB); David Neil Slatter, Bristol (GB)

(73) Assignee: Hewlett-Packard Development Company L.P., Houston, TX (US)

( * ) Notice: Subject to any disclaimer, the term of this patent is extended or adjusted under 35 U.S.C. 154(b) by 1075 days.

(21) Appl. No.: 10/103,854

(22) Filed: Mar. 25, 2002

(65) Prior Publication Data
US 2002/0140988 A1 Oct. 3, 2002

(30) Foreign Application Priority Data
Mar. 28, 2001 (GB) .................... 0107805.4

(51) Int. Cl.
*G06F 3/12* (2006.01)
*G06F 15/00* (2006.01)

(52) U.S. Cl. ...................... 358/1.15; 358/1.6
(58) Field of Classification Search .......... 358/1.15, 358/1.6, 1.1, 1.13, 1.18, 1.12, 1.14, 540, 358/538, 407, 434, 435, 436, 438, 439, 468, 358/302, 450, 402, 453, 471
See application file for complete search history.

(56) References Cited

U.S. PATENT DOCUMENTS

| | | | | |
|---|---|---|---|---|
| 4,148,072 A * | 4/1979 | Vockenhuber | ............... | 348/64 |
| 5,267,042 A | 11/1993 | Tsuchiya et al. | ............ | 348/143 |
| 5,929,849 A * | 7/1999 | Kikinis | ........................ | 725/113 |
| 6,011,537 A * | 1/2000 | Slotznick | ..................... | 715/733 |
| 6,070,167 A * | 5/2000 | Qian et al. | ................... | 707/102 |
| 6,133,947 A | 10/2000 | Mikuni | ........................ | 348/239 |
| 6,421,470 B1 * | 7/2002 | Nozaki et al. | .............. | 382/321 |
| 6,919,920 B2 * | 7/2005 | Squilla et al. | ......... | 348/207.99 |
| 6,920,606 B1 * | 7/2005 | Jablonski et al. | ........ | 715/501.1 |

FOREIGN PATENT DOCUMENTS

EP     0 920 179     6/1999

OTHER PUBLICATIONS

WPI Abstract Accession No. 1998-203999 & JP 010056608 Sony (see abstract).
WPI Abstract Accession No. 1998-152346 & JP 010023398 Kazutoshi (see abstract).

* cited by examiner

*Primary Examiner*—Dov Popovici

(57) ABSTRACT

Apparatus for providing composite electronic image of a scene including at least one link to other information comprises a camera for providing an image signal, a link generator responsive to the scene or the immediate environment for generating a link signal, and a combiner which combines the image and link signals to provide the electronic image. As shown, the viewed scene includes a zoo information display with a barcode which is read by the camera to provide the final part of the link information for concatenation onto a first part which is loaded into the camera at entry to the zoo (or preloaded if the camera belongs to the zoo). Clicking on the display on the viewed image provides a link to a zoo web page associated with the enclosure.

67 Claims, 3 Drawing Sheets

RECORDING IMAGES TOGETHER WITH LINK INFORMATION

The present invention relates to the production of a composite signal comprising an image signal together with a link information signal providing associated additional link information. In use the link information may be accessed for example by clicking a cursor on a predetermined area of, or the whole of, the image.

This type of composite signal occurs, for example in the Windows (trade mark) environment on a PC, where there is an underlying functional map corresponding to the image area (sometimes referred to as metadata), and where selected areas will cause a cursor to alter in a predetermined manner, commonly a change in shape, and where clicking on the changed cursor will cause the PC to effect a function as determined by the functional map. This also occurs in web pages, where the function is commonly to redirect the computer to a different web file, as in an HTML. Effectively both image (pixel) data and functional data (link information) are associated with the same display area, the latter normally being a local area within the display as opposed to the whole display area. The cursor pixel position is detected by the PC, which responds when it falls within the local area by altering a cursor characteristic, and if the mouse is then clicked the PC proceeds to operate upon the associated functional data.

The link information may be at least part of a pointer to a different address, for example to provide further information to the user. Still and moving images are increasingly produced from representative digital signals, for example as part or the whole of a web page, and web pages commonly include links or pointers to other web pages or other files. Where a full address is given by a link, this may be the URL (Uniform Resource Locator) to a web page. In other instances, the web page is one of a set having a common home address, and the link provides additional address information which when concatenated with the home address provides the full URL. Thus while a pointer to additional information may be a complete address as in a full URL, the necessary link information may be the full address or only a variable portion thereof.

However, the link information may take other forms as required. For example, it may provide an e-mail address.

Web design tools are known which enable a web author to put images on web pages and manually to create one or more "hot-spots" on the image which are hyperlinked to other web pages. Not only is this process tedious, but the author needs to know the destination web page when the "hot-spots" are created.

It is also known to use a global positioning system (GPS) to associate location data with a photograph, typical examples being described in U.S. Pat. No. 6,091,956 (Hollenberg) and U.S. Pat. No. 5,267,042 (Tsuchiya). In certain instances, the location data is subsequently used to provide additional information. Thus in U.S. Pat. No. 6,133,947 (Mikuni) the location data is used to relate the camera image to a map.

In U.S. Pat. No. 5,926,116 (Kitano) the location data is used for image retrieval from a local Web database comprising images which are associated with respective locations and URLs; matching of location data and image data provides the corresponding URL so that further information related to the image in question can be obtained at the point of use, and no further use or storage of the image data appears to be envisages—it is merely used for the purposes of web access.

European Patent Application No. 0 920 179 (Eastman Kodak) describes a photographic system in which a database is available at a "hot spot" site where pictures are likely to be taken. A camera has stored therein personality files peculiar to the used, and there is wireless communication between the camera and database, by means of which selected data is stored in association with a picture taken by the camera user. In a second embodiment there is three-way wireless communication between the camera, database and a base station, and the database and personality files may be located in the base station. The data itself may be stored, or there may be stored an address or pointer such as a URL for later downloading of the data, either from the web or from the base station. In this system, the data or address is associated with the whole of the "hot spot" site, and is recorded substantially simultaneously with the picture.

The present invention facilitates the automatic generation of one or more information associated with a camera image, or with at least one area of the image. In its broadest aspects, by contrast with Kitano it does not require immediate knowledge of absolute location as provided by a GPS system; nor does it require access to a local database such as a Web database, nor access to any pre-stored images for confirmation of the required web address. Furthermore the image matching step of Kitano is usually a very difficult process, and is not necessary to the implementation of the present invention in its broadest aspect, where all that is required for generating the link information may be, for example, the reading of a barcode or an ASCII sequence.

In a first aspect the present invention provides apparatus for providing a composite signal comprising an image signal together with a link information signal providing additional link information, the apparatus comprising image signal generating means for providing an image signal from a viewed scene, link signal means responsive to the viewed scene or its immediate environment for generating a said link information signal, and signal combining means for combining the image and link information signals to provide a said composite signal, wherein the link information signal is associated with a selected portion only of the image represented by the image signal.

In this way, when the combined signal is viewed, for example as an HTML, clicking the cursor on the selected portion could serve to cause a function to be executed, for example retrieval of associated information via the link information signal, or sending the stored image signal by e-mail to a party identified as being present in the viewed scene.

In a second aspect the present invention provides apparatus for providing a composite signal comprising an image signal together with a link information signal providing additional link information, the apparatus comprising image signal generating means for providing an image signal from a viewed scene, link signal means responsive to the viewed scene or its immediate environment for generating a said link information signal, and signal combining means for combining the image and link information signals to provide a said composite signal, wherein the image signal generating means and the link signal means can operate independently of each other at different times and the combining means is arranged to coordinate the combining of the image and link information signals.

In this way, for example, a camera user can arrive at an interesting location, and take one or a number of pictures which are stored electronically. At some time during the stay at that location the user triggers the camera to record the link information signal, which is then associated with the stored image signals. Thus it might be arranged that the user needs to store the link information signal first and then proceed to take pictures, all of which are then associated with the link information signal until another link information signal is stored at a different location. Alternatively association of the link information signal with each image signal may be entirely under the user's control.

Where the link information signal is associated with a selected portion of the image, the selected portion could be an icon which is inserted at a predetermined position in the image field, or a variable position in the image field determined for example by a feature in the viewed scene. However, it could also be an area of the image itself (with no added icon), which could be detected by a change in appearance or a cursor or that part of the image for example, and this is particularly useful where the link information signal is derived from an optical feature in the viewed scene.

Thus in a third aspect the present invention provides apparatus for providing a composite signal comprising an image signal together with a link information signal providing additional link information, the apparatus comprising image signal generating means for providing an image signal from a viewed scene, link signal means responsive to an optical feature in the viewed scene or its immediate environment for generating a said link information signal, and signal combining means for combining the image and link information signals to provide a said composite signal. Commonly, the link information signal will be associated with a selected portion only of the image represented by the image signal (although it could be associated with the entire image, e.g. if it provided an e-mail address, or with an icon added to the stored image) and in a preferred embodiment it is associated with the feature giving rise to the link information signal.

Where the ink signal is responsive to a feature in the viewed scene or immediate environment, this may be identified by analysis of the image signal if the feature is a visible one, for example a bar-code reader if the feature is in the form of a bar-code, or image recognition circuitry, or by a separate sensor selected according to the properties of the feature, such as an infra-red, acoustic, magnetic of rf transducer where the feature is arranged to emit encoded signals. Detection of a visible feature may be via the image signal or via a separate sensor.

The image signal generating means is often an electronic still or video camera, and the image signal may be for example a recording of a still image, e.g. a photograph as produced by an electronic still or video camera, or live or recorded video, i.e. of a moving image as viewed by a video camera. The photographs or video clips may be provided as an album.

However, the image signal generating means could also comprise a photographic still or video camera, together with means for converting the images to an image signal, for example a scanner.

The camera is preferably a personal camera for operation by a user. However, where the link information is associated with a selected portion only of the image signal, the camera could be a site camera at a predetermined location, for example for feeding image and link information signals to a central database (this may have utility for example where the subject is a group of people and it is desired to send pictures to selected ones of the group—the link information could include the e-mail addresses in such a case).

Preferably the link signal means or at least a part thereof is part of the camera. Where the link information signal provides at least part of an address to a remote or local database, the camera may be adapted to interrogate the database at the time of taking the picture for the purpose of obtaining further information and combining it with the image signal. The further information may be another address, or part thereof, or other more directly useful information. However, preferably it is the locally provided link information signal which is combined with the image signal and access to any necessary database is effected later on the basis of the stored composite signal.

Preferably the signal combining means is part of the camera.

In the case of video clips, these may be actuated from the album, which may show just the starting frame initially. Also the link information may be arranged to be executable either on a still image from the video, or the moving image. Where the location of the link information moves with the viewed image, i.e. a local "hot spot" as opposed to a fixed icon, this may be effected using standard tracking techniques.

The link information signal may be any signal directly providing a full or partial address to a source of data or information, for example a required file location, and the file location may be local or remote. However, it could also be a differently coded signal which may be converted to a partial or complete address for example by the use of an appropriate local or remote database or look-up table.

Where the address provided by the link information signal is only a partial address, the full address to the required location may be implicit, or it may be provided by combining it in a known or predetermined manner with a supplementary link signal. The latter may be predetermined, or a variable determined by the conditions of use.

Thus in the case which depends from a home page as described above, the supplementary link signal may be the home address which is a variable dependent on the set of web pages under consideration, but otherwise predetermined by that set.

In another example a site owner (for example of a theme park where there are a number of rides, or another public venue where there are a number of exhibits) may also own a website. The link information may be supplied by means responsive to the scene or the immediate environment as appropriate, as outlined in more detail below, but may only provide a partial address or address information, in this case a partial URL needing to be supplemented by the home website address. There may then be a facility for programming the visitor's camera with the home address (for example when paying a fee for admission to the site), which is thus variable supplementary link information dependent on the site being visited. Alternatively, where a camera is provided by site owner this may be pre-programmed with the home address of the website, which is therefore wholly predetermined supplementary link information.

Indeed, if used on-site with facilities provided by the site owner, for example locally stored computer files, the remainder of the address may be implicit and may never actually need to be used.

Location data, for example as provided by the aforementioned US Patents may also be combined with the electronic image for providing a further link information signal. However, where the means for providing such location data involves a GPS, this is not regarded as being means responsive to the scene or the immediate environment, since GPS requires a transponder for active interrogation and response to establish location, and the transponder is responsive neither to the scene or its immediate environment, only to the location thereof as determined by the GPS.

Commonly, as noted above, the means responsive to the scene or the immediate environment will include means responsive to a feature within the scene or environment. A number of different features can be utilised, according to the intended method and location of use of the apparatus. Examples include:

1. Object recognition means, which recognises when a target having a predetermined characteristic such as form, shape or motion (for example a person's face, or a vehicle such as a car, or a recognisable logo) enters or is in the field of view of the camera.
2. Means for reading encoded patterns in the scene where the target is expected to bear such a pattern. Exemplary patterns include a bar code or ASCII URL provided on a badge worn by a person attending an event or visiting a public place such as an amusement park, or on a sign or information board at an exhibit, or on a web camera (e.g. also viewing the same or a related image); or a car number plate.
3. Where the feature is not a visible one, means for responding to a remote transmitting beacon, or for interrogating a transponder, carried by the target, e.g. as in 2 above. The necessary one-way or two-way communication may be via any known means, such as radio, infra-red, or ultra-sound, and the same or different ones of these methods may be used for two-way communication as desired.

The link information signal may be directly generated in response to detection of feature(s) within the scene or environment. Thus in option 2 in the preceding paragraph, the location and information in the bar code or ASCII URL may be sufficient in itself to be translated into the hyperlink with an appropriate location in the resulting electronic image.

In other cases, it may be necessary to look up stored information in a database to associate the detected feature(s) with a corresponding hyperlink or URL, which is then added to the stored image at an appropriate location, and the means responsive to the scene or the immediate environment will include means for interrogating the database for retrieving the associated hyperlink or URL information. In such a case, the database may be local or remote, for example provided by a publicly available service. In an alternative form of apparatus, the link information is stored with the image signal for later use in interrogating a database.

As an example, a person attending an event may be recognised from a local database prepared by assembling images of each person attending and suitable address information including link information, e.g. the person's web address. When a person is recognised as being viewed by a camera, the database is interrogated to retrieve the associated link or URL information, which is then associated with the location of the person in the electronic image, or with the entire image.

When at least part of the link information is derived from a person (e.g. recognition or reading a tag) the link may be to provide personal details, such as a mailing address, or an e-mail address. There may be a facility for on-site recordal of the composite signal to facilitate actions at a later date, possibly computed to occur a predetermined interval after the date at which the original image was taken, such as issuing reminders about the site to the person involved, and/or details of forthcoming events.

When at least part of the link information is derived from a predetermined location, the link may be to provide further details about the location. For example where an information board for an exhibit also provides the link information e.g. as a bar code, the board information and/or other educational details about the exhibit or site may then obtained over the web, including historical details or images. Additionally or alternatively there may be provided access to advertising; to details about admission charges and times; to details concerning future exhibits (e.g. type and timing); and/or to on-line shops associated with the location.

The predetermined location may also be on, or associated with a web camera, for example one also viewing the image at the time of taking the picture. Again this may be indicated by an icon in the reproduced picture so that the camera may be accessed at a later date to revisit the location over the web, so that, for example, the growth of an animal (web camera at a zoo) or the development of a building site (web camera at a viewing platform of a development) may be followed.

Where a logo in the environment is recognised, there may be automatic generation of a link to the site of the logo owner, for example for the purposes of advertising by the logo owner and revenue from the owner of the site where the logo is located, or for links to related attractions.

Further link information may be added to the electronic image to associate that image with other images taken closely together in time, for example other images of the same target taken by the same camera, or, by consulting a local or remote database receiving information from a plurality of cameras distributed over a site, other images of the same target taken by different cameras. Where images contain the same link information, they may be grouped to each other by a further link. Not only can this provide a customer with a set of related images, but it can facilitate tracking of the customer and the provision of other information to the manager of the site. In such a case, there may be a facility for inserting in the viewed image an indication that the link exists, for example as a clickable icon at the foot of the picture (being associated with the link information in the image functional map).

The or one link may be associated with substantially the entire image, but in general a link will be associated with a particular location or small area within the image. The latter may be arranged to over-ride any link associated with the entire image.

In general it may be desirable to include an icon in the viewed image to indicate where a link exists. The placement of such an icon may be predetermined, or, preferable, placed within a relatively uninteresting area of the image as determined, for example, by analysis of the image. However, in certain instances it will be possible to associate the link with the area of or including an identifiable object in the image, for example a car or an information board, or a logo, such areas being determined for example by analysis of the image signal.

It will be understood that the link information may be derived from the scene when taking the picture, as in the third aspect of the invention, but that it is also possible to capture the link information separately for combination with a picture taken earlier or later, as in the second aspect of the invention. Thus, taking the example of a visitor at an exhibit with an information board, a control may be provided on the camera whereby a link may be read by the camera immediately before or after (the control may provide selection as to which, or it may be predetermined) a picture of the exhibit is taken, the link information signal and image signal being combined to provide the composite signal.

As already noted, in the first and second aspects of the invention the link information need not be generated by optical recognition of a feature in the scene or environment as occurs in the third aspect of the invention. Thus it is also possible to arrange for active local transmission of link information to a dedicated camera, for example by radio, infra-red or inductive linkages, or by a transponder responsive to a signal from the camera. In such a case, the camera may provide an indication to the user when link information is present, and there may further be the choice of whether of not to include the information in any picture. Again taking the example of a visitor at an exhibit, there may be an infra-red transmitter of link information in the vicinity of the exhibit to which the camera responds by illuminating an LED externally and/or in the camera viewfinder. When the visitor takes a picture of the exhibit the link information signal in combined with the image signal.

Again, direct signal means may provide at least part of the link information. For example a visitor may place the camera in a dedicated receptacle at the location, where electrical contact is made to the camera and information passed thereto, e.g. by the transmission of a signal containing the link information, or by the use of coded contacts with an arrangement peculiar to the location.

Further features and advantages of the invention will become clear upon consideration of the appended claims, to which the reader is referred, and upon a reading of the following more detailed description of an exemplary embodiment of the invention, made with reference to the accompanying drawing, in which:

FIG. 1 schematically illustrates the use of an embodiment of the invention in which a person is taking a picture of one of a number of exhibits;

Figure 4:
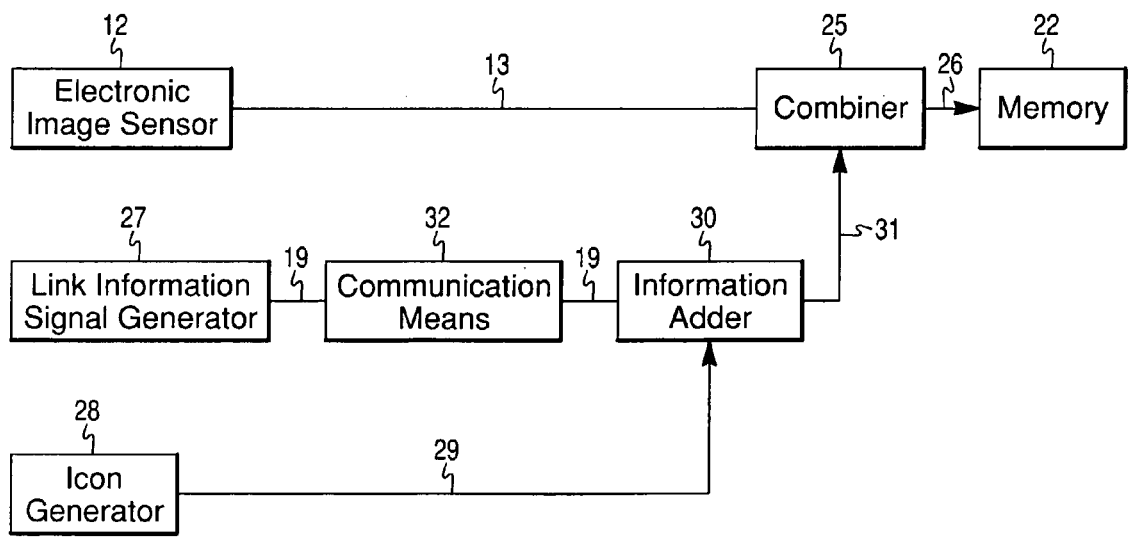
Figure 5:
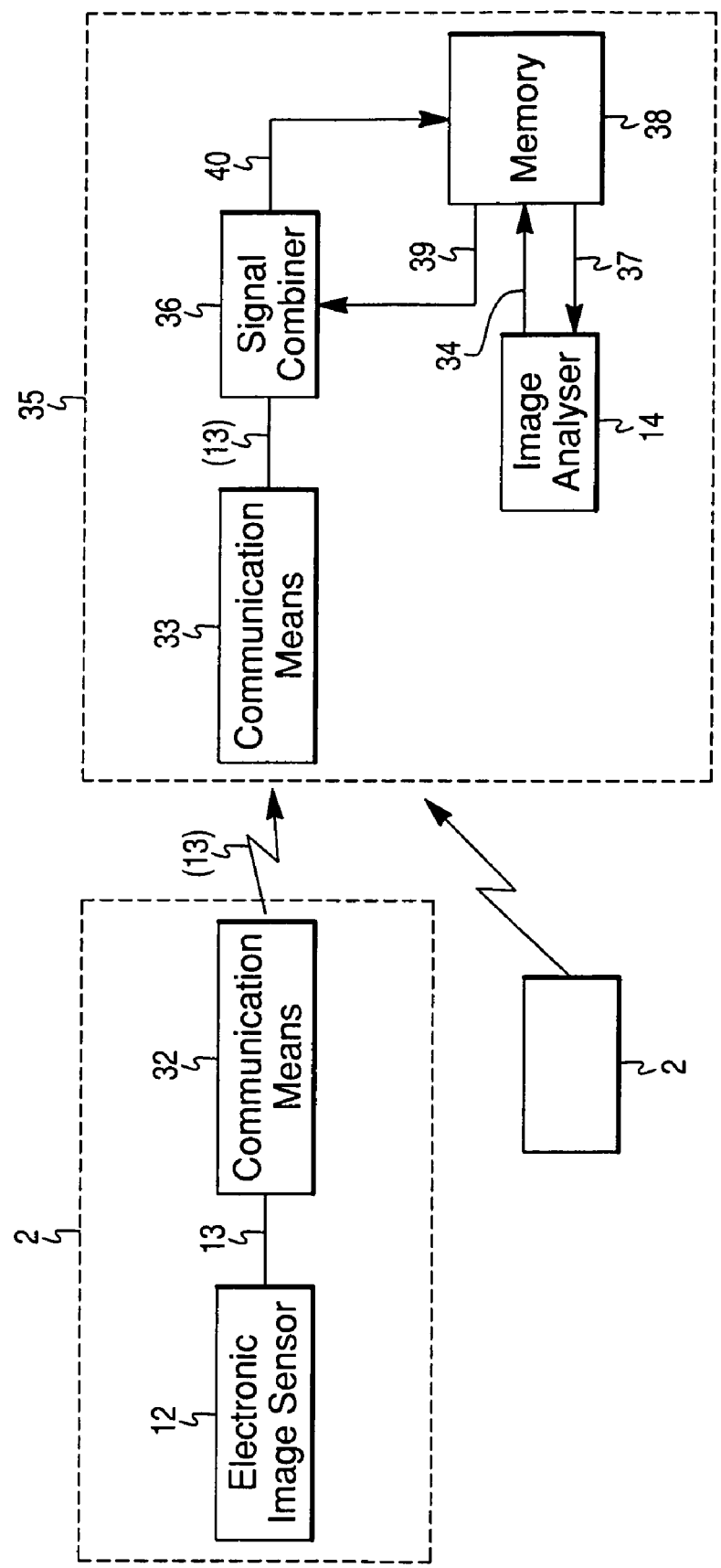

FIG. 4 a schematic block diagram of apparatus where the link information generator is independent of the image signal generator; and FIG. 5 is a schematic block diagram of apparatus in which a camera operates in conjunction with a base station where the composite signals are generated and stored.

Figure 1:
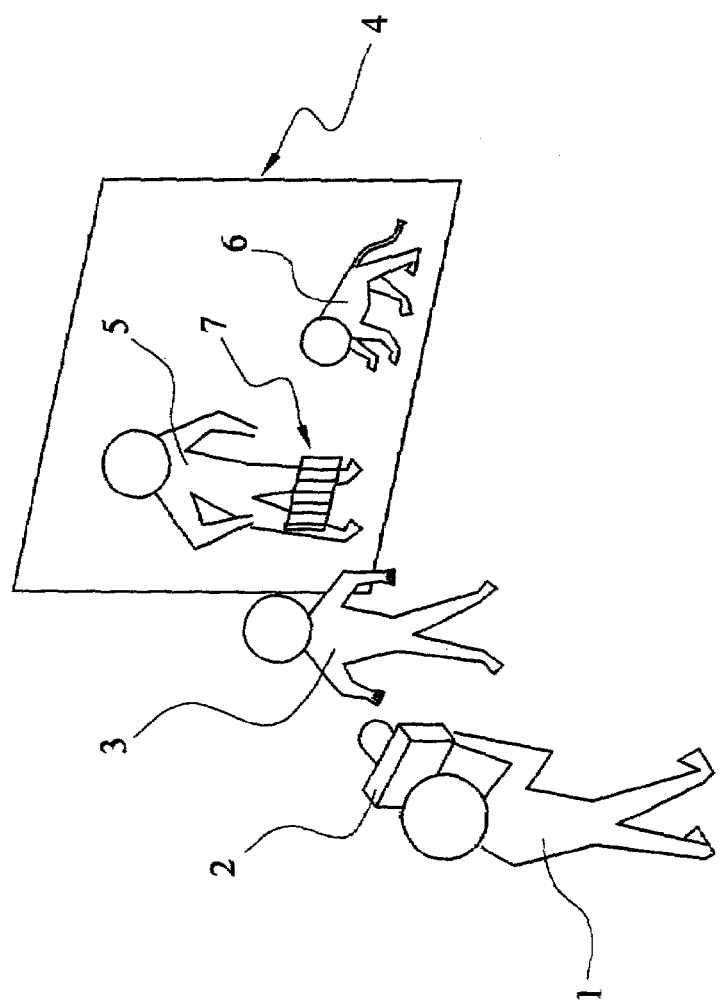

FIG. 1 shows a person (visitor) 1 who has paid to enter a zoological park (zoo), and who has been provided with an electronic camera 2, which contains predetermined link information relating to the base URL for the zoo. The zoo has a website with a series of pages relating to different exhibits/enclosures, the link information for each page commencing with the base URL.

Visitor 1 is using camera 2 to take a photograph of a scene which includes another visitor 3 standing looking into an enclosure 4 where an attendant 5 is feeding an animal 6. In front of the enclosure and within the view of the camera 2 is located an information display 7 about the animal in the enclosure.

The display 7 also includes a bar code which is recognised and read by the camera to provide link information. This is concatenated onto the end of base information to provide a full hypertext link or URL associated with a hot-spot in the region of the barcode in the resulting electronic image. Alternatively an icon associated with the URL may be provided at a predetermined location such as a corner of the image.

Figure 2:
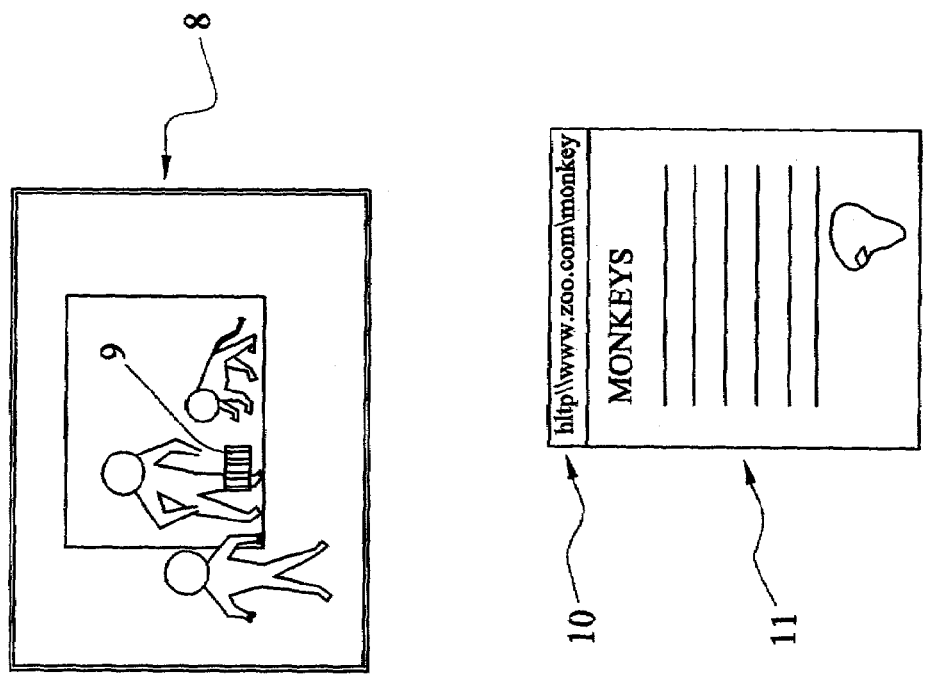
FIG. 2 illustrates the image and further information available from the activity illustrated in FIG. 1.

When the image is later inspected on a viewer 8, FIG. 2, clicking on the area of the barcode 9 (or icon) causes the hyperlink or URL 10 to be traversed to obtain the web page 11 relating to the enclosure, for example educational detail regarding the animal 6.

Figure 3:
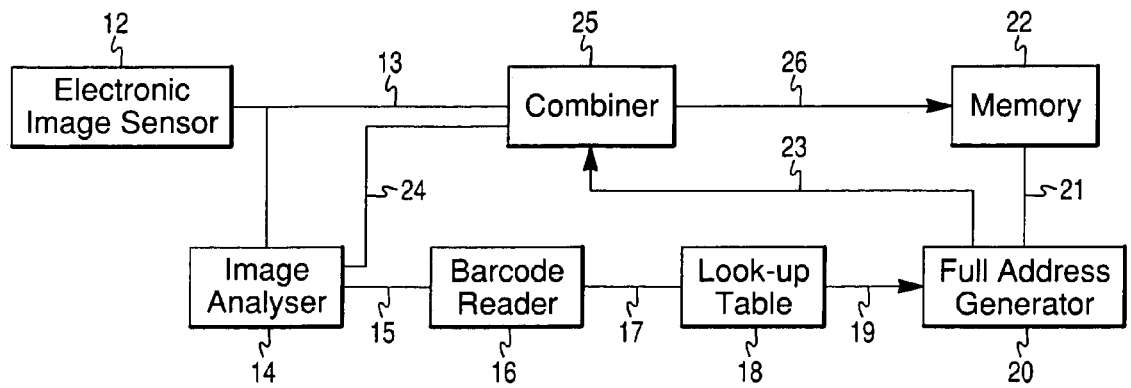
FIG. 3 is a schematic block diagram of apparatus suitable for use in the activity of FIG. 1.

FIG. 3 shows the electronic image 12 sensor of camera 2, which provides an image signal 13 to an image analyser 14 and to a first input of a signal combiner 25. The image analyser 14 is arranged to identify areas of bar code and to provide a corresponding output 15 therefrom to a bar code reader 16. Analyser 14 also identifies the position (area) of the bar code and sends a corresponding signal 24 to a second input of combiner 25. The output 17 of the reader 16 is passed to a look-up table 18 for providing a corresponding link information signal 19 to a full address generator 20 in which it is combined with base address or URL information 21 from a memory 22 in the camera 2 to provide a full address or URL 23. This is sent to a third input of the combiner 25, which acts on the first to third inputs to provide a composite signal 26 for storage in memory 22. In the composite signal 26 the area of the bar code is associated with the full address signal 23 including the link information signal 19.

Where the bar code is such that the reader directly forms the link information signal 19, table 18 is omitted.

In this example the camera 2 is returned to the zoo at the exit, with images on disc being given to the visitor 1. Clearly, it would also be possible for the visitor 1 to own a camera 2 which is loaded with the base URL on admission to the zoo, with image retrieval after the visitor has left the zoo.

Where the camera remains with the zoo, it may be appropriate for the base information to be permanently stored in the camera, so that a stolen camera is effectively of reduced use in other locations. However, storage may be temporary and re-writable, and this would be necessary for a camera belonging to a visitor.

In FIG. 4, the camera includes a separate link information signal generator 27, for example a bar code reader which needs to be swiped near a bar code at the location in question prior to taking pictures. The resulting link signal 19 is stored in a memory 32 until another link information signal is recorded. An icon generator generates an icon signal 29 comprising an icon representative image signal and positional information for the icon. Signals 19 and 29 are associated in an information adder 30, the output of which is added to the video signal 13 in signal combiner 25. The positional information for the icon may be predetermined or under the control of the user.

In general, generator 27 will be adapted to respond to the available link information, which may be provided by any communication means known in the art. For example it may comprise an infra-red, rf, inductive or other wireless receiver, or it may require an electrical connection to be made.

FIG. 5 illustrates an embodiment where the output of the sensor 12 of a camera is passed via communication means 32, 33 to a central station 35, also receiving data from other cameras at different locations. Means 32 could be hard wiring but where the camera is a personal one it is preferably a wireless means.

The signal 13 is received at the input 33 of station 35 where it is passed to a signal combiner 36 and an image analyser 14. A memory 38 stores information 37 regarding all or of selected visitors to a site, for example their appearance in association with a visitor identification code and an e-mail address. This could be effected as each visitor enters the site. A second input of the image analyser 14 is coupled to the memory 38 to receive the information 37, and is arranged to identify people in the image signals with visitors recorded in memory 38 and to pass the corresponding identification code 34 back to the memory 38. When this happens, the memory generates a corresponding link signal 39 comprising at least the visitor identification code, which is combined with the video signal 13 in combiner 36 for storage as a composite signal 40 in the memory 38.

At a later stage, a visitor may visit the central station 35 to view pictures containing link information identifying them, or at a still later stage such images may be transmitted to a visitor by e-mail.

It should be appreciated that, as in FIG. 5, the image signal may be transmitted to a remote location for combination with the link information signal and recordal rather than at the camera, for example at a central computer in an installation where there are a plurality of cameras all linked to the computer.

Also, as in FIG. 5, the means providing the link information signal is not necessarily part of the camera. Thus for example where the image signal is sent to a central computer the link information signal there may be means at a particular location for identifying the camera and transmitting the identification information to the central computer together with associated link information, e.g. relating to the particular location, etc. In general, any or all of the signal transmission paths shown in the Figures may be between parts of the same apparatus for example the camera of FIG. 3) or parts of different apparatus, as in the camera and base station of FIG. 5.

The invention claimed is:

1. Image signal apparatus for providing a composite signal comprising an image signal together with a link information signal providing additional link information, the apparatus comprising:
    an image signal generator including a camera, the camera being a photographic still camera, for providing an image signal from a viewed scene;
    a link signal generator responsive to the viewed scene or its immediate environment for generating said link information signal; and
    a signal combiner for combining the image and link information signals to provide said composite signal, wherein the link information signal is associated with a selected portion only of the image represented by the image signal.

2. Apparatus according to claim 1 wherein the link signal generator is responsive to coded information, or a beacon, or a transponder, or a direct signal input means within the scene or the immediate environment for directly or indirectly providing said link information signal.

3. Apparatus according to claim 1 wherein the link signal generator is responsive to an optical feature in the viewed scene or its immediate environment for generating said link information signal.

4. Apparatus according to claim 3 wherein the link signal generator includes an image signal analyser for analysing said image signal for recognising therefrom said optical feature, and for generating said link information signal in response thereto.

5. Apparatus according to claim 1 wherein the signal combiner is arranged to associate said link information signal with a selected portion only of the image represented by the image signal.

6. Apparatus according to claim 3 wherein said selected portion comprises said optical feature.

7. Apparatus according to claim 5 and comprising an icon generator for addition of an icon signal to said image signal, wherein said selected portion comprises said icon.

8. Apparatus according to claim 5 wherein said selected portion is predetermined.

9. Apparatus according to claim 5 including an image analyser for determining said selected portion by analysis of the image signal.

10. Apparatus according to claim 5 arranged to permit at least two said selected portions with respective associated link information.

11. Apparatus according to claim 1 wherein the link information signal provides part of a pointer which also comprises predetermined information, and the apparatus further includes a store for temporarily or permanently storing such predetermined information and for combining the link information and the predetermined information to provide said pointer.

12. Apparatus according to claim 1 and provided with a further link information generator for generating additional link information from information regarding the location of the scene, for combination with said image signal.

13. Apparatus according to claim 1 and provided with an ancillary link information generator for generating ancillary link information for linking images of the same target taken by the same camera, or by different cameras operating on the same site, for combination with said image signal.

14. Apparatus according to claim 1 wherein the link signal generator is included in the camera.

15. Apparatus according to claim 1 wherein the signal combiner is included in the camera.

16. An installation comprising apparatus according to claim 1 and including a plurality of said cameras, and including a memory for recording the composite signals from each camera at a common location.

17. An installation according to claim 16 wherein the memory is arranged to group the composite signals according to at least one said link information signal.

18. An installation according to claim 17 wherein the memory is arranged to group the composite signals according to at least one said link information signal.

19. Apparatus for providing a composite signal comprising an image signal together with a link information signal providing additional link information, the apparatus comprising:
    an image signal generator including a camera, the camera being a photographic still camera, for providing an image signal from a viewed scene;
    a link signal generator responsive to a feature in the viewed scene or its immediate environment for generating said link information signal; and
    a signal combiner for combining the image and link information signals to provide said composite signal, wherein the image signal generator and the link signal generator can operate independently of each other at different times and the signal combiner is arranged to coordinate the combining of the image and link information signals.

20. Apparatus according to claim 19 wherein the link signal generator is responsive to coded information, or a beacon, or a transponder, or a direct signal input means within the scene or the immediate environment for directly or indirectly providing said link information signal.

21. Apparatus according to claim 19 wherein the link signal generator is responsive to an optical feature in the viewed scene or its immediate environment for generating said link information signal.

22. Apparatus according to claim 21 wherein the link signal generator includes an image signal analyser for analysing said image signal for recognising therefrom said optical feature, and for generating said link information signal in response thereto.

23. Apparatus according to claim 19 wherein the signal combiner is arranged to associate said link information signal with a selected portion only of the image represented by the image signal.

24. Apparatus according to claim 21 wherein said selected portion comprises said optical feature.

25. Apparatus according to claim 23 and comprising an icon generator for addition of an icon signal to said image signal, wherein said selected portion comprises said icon.

26. Apparatus according to claim 23 wherein said selected portion is predetermined.

27. Apparatus according to claim 23 including an image analyser for determining said selected portion by analysis of the image signal.

28. Apparatus according to claim 23 arranged to permit at least two said selected portions with respective associated link information.

29. Apparatus according to claim 16 wherein the link information signal provides part of a pointer which also comprises predetermined information, and the apparatus further includes a store for temporarily or permanently storing such predetermined information and for combining the link information and the predetermined information to provide said pointer.

30. Apparatus according to claim 19 and provided with a further link information generator for generating additional link information from information regarding the location of the scene, for combination with said image signal.

31. Apparatus according to claim 19 and provided with an ancillary link information generator for generating ancillary link information for linking images of the same target taken by the same camera, or by different cameras operating on the same site, for combination with said image signal.

32. Apparatus according to claim 19 wherein the link signal generator is included in the camera.

33. Apparatus according to claim 19 wherein the signal combiner is included in the camera.

34. An installation comprising apparatus according to claim 19 and including a plurality of said cameras, and including a memory for recording the composite signals from each camera at a common location.

35. Apparatus for providing a composite signal comprising an image signal together with a link information signal providing additional link information, the apparatus comprising:
an image signal generator including a camera, the camera being a photographic still camera, for providing an image signal from a viewed scene;
a link signal generator responsive to an optical feature in the viewed scene or its immediate environment for generating said link information signal; and
a signal combiner for combining the image and link information signals to provide said composite signal.

36. Apparatus according to claim 35 wherein the link signal generator includes an image signal analyser for analysing said image signal for recognising therefrom said optical feature, and for generating said link information signal in response thereto.

37. Apparatus according to claim 35 wherein the signal combiner is arranged to associate said link information signal with a selected portion only of the image represented by the image signal.

38. Apparatus according to claim 37 wherein said selected portion comprises said optical feature.

39. Apparatus according to claim 37 wherein said selected portion is predetermined.

40. Apparatus according to claim 37 including an image analyser for determining said selected portion by analysis of the image signal.

41. Apparatus according to claim 37 arranged to permit at least two said selected portions with respective associated link information.

42. Apparatus according to claim 41 and comprising an icon generator for addition of an icon signal to said image signal, wherein said selected portion comprises said icon.

43. An installation comprising apparatus according to claim 39 and including a plurality of said cameras, and including a memory for recording the composite signals from each camera at a common location.

44. An installation according to claim 43 wherein the memory is arranged to group the composite signals according to at least one said link information signal.

45. Apparatus according to claim 35 wherein the link information signal provides part of a pointer which also comprises predetermined information, and the apparatus further includes a store for temporarily or permanently storing such predetermined information and for combining the link information and the predetermined information to provide said pointer.

46. Apparatus according to claim 35 and provided with a further link information generator for generating additional link information from information regarding the location of the scene, for combination with said image signal.

47. Apparatus according to claim 35 and provided with an ancillary link information generator for generating ancillary link information for linking images of the same target taken by the same camera, or by different cameras operating on the same site, for combination with said image signal.

48. Apparatus according to claim 35 wherein the link signal generator is included in the camera.

49. Apparatus according to claim 35 wherein the signal combiner is included in the camera.

50. A method of generating a composite signal, comprising:
generating an image signal corresponding to a scene using a photographic still camera;
generating a link information signal providing a director to additional information in response to the scene or the immediate environment; and
combining the image and a link information signal to provide said composite signal, wherein the link information signal is associated with a selected portion only of the image represented by the image signal.

51. A method according to claim 50 wherein the link information signal provides part of a pointer which also comprises predetermined information, and including the further step of temporarily or permanently storing the predetermined information and for combining the link information and the predetermined information to provide said pointer.

52. A method according to claim 51 wherein said predetermined information is recorded once before a plurality of said composite signals are recorded.

53. A method according to claim 50, wherein the link information comprises an email address or a pointer thereto, and including the step of sending a message to said email address.

54. A method according to claim 50 and including the step of analysing the image signal to determine said link information signal.

55. A method according to claim 50 and including the step of using the link information signal to interrogate a remote or local database.

56. A method of generating a composite signal, comprising:
- generating an image signal corresponding to a scene using a photographic still camera;
- generating a link information signal providing a director to additional information in response to the scene or the immediate environment; and
- combining the image and a link information signal to provide said composite signal, wherein the image signal generating means and the link signal means can operate independently of each other at different times and the combining means is arranged to coordinate the combining of the image and link information signals.

57. A method according to claim 56 wherein the link information signal provides part of a pointer which also comprises predetermined information, and including the further step of temporarily or permanently storing the predetermined information and for combining the link information and the predetermined information to provide said pointer.

58. A method according to claim 57 wherein said predetermined information is recorded once before a plurality of said composite signals are recorded.

59. A method according to claim 56, wherein the link information comprises an email address or a pointer thereto, and including the step of sending a message to said e-mail address.

60. A method according claim 56 and including the step of analysing the image signal to determine said link information signal.

61. A method according to claim 56 and including the step of using the link information signal to interrogate a remote or local database.

62. A method of generating a composite signal, comprising:
- generating an image signal corresponding to a scene using a photographic still camera;
- generating a link information signal providing a director to additional information in response to an optical feature in the scene or the immediate environment; and
- combining the image and link information signal to provide said composite signal.

63. A method according to claim 62 wherein the link information signal provides part of a pointer which also comprises predetermined information, and including the further step of temporarily or permanently storing the predetermined information and for combining the link information and the predetermined information to provide said pointer.

64. A method according to claim 63 wherein said predetermined information is recorded once before a plurality of said composite signals are recorded.

65. A method according to claim 62 and including the step of analysing the image signal to determine said link information signal.

66. A method according to claim 62 and including the step of using the link information signal to interrogate a remote or local database.

67. A method according to claim 62, wherein the link information comprises an email address or a pointer thereto, and including the step of sending a message to said e-mail address.

* * * * *